8654X
N. Dodge.
Paddle Wheel.
Patented Feb. 20, 1835.
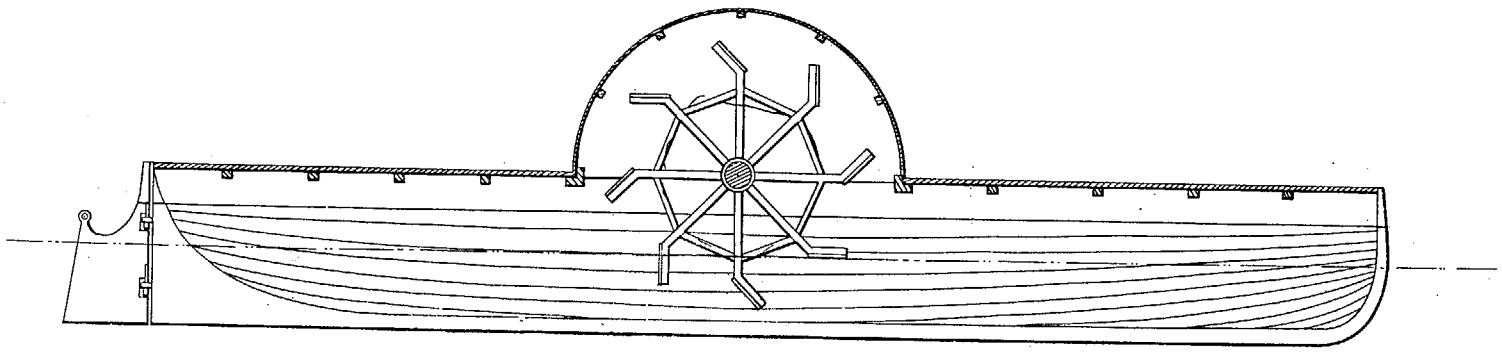
N. PETERS, PHOTO-LITHOGRAPHER, WASHINGTON, D. C.

Feb. 20. 1835 [illegible] 461.

8654X
2/20/1835

Nehemiah Dodge
&
Letters Patent

The schedule referred to in these Letters Patent and making part of the same containing a description in the words of the said Nehemiah Dodge him-self of his improvement in Water wheels for Steam Boats which he de-nominates the continual draught buoyant wheel—

The continual draught buoyant wheel is constructed like a common Steam boat wheel except the shafts when the blades are attached incline forward to an angle of 45 degrees. A Brace running from the outer edge of one blade or shaft to the angle of the other shaft and other braces necessary to make it strong.

This wheel though simple in its construction when attached to a steam boat under way will naturally buoy up the boat and as the blades recede from the water there will not be that resistance which the common steam boat wheel is necessarily obliged to contend with; consequently a steam boat with wheels constructed after this model must pass through the water with much greater velocity than with the commonly constructed wheel.

The speed of the boat can also be checked by wheels constructed after this manner much sooner than by the common wheels as the natural tendency of a backward motion to the wheels is to draw the Boat down in the water Witness
Edward Bruger }
Th. Wilson }

Nehemiah Dodge

Ent'd.
W.H.

(Patented 20 Feby. 1835)

252 wds (Drawing)